United States Patent
Wang et al.

(10) Patent No.: US 11,671,015 B2
(45) Date of Patent: Jun. 6, 2023

(54) THREE-LEVEL BOOST CIRCUIT AND MULTIPLE-OUTPUT PARALLEL SYSTEM

(71) Applicant: SUNGROW POWER SUPPLY CO., LTD., Anhui (CN)

(72) Inventors: Tengfei Wang, Hefei (CN); Jiacai Zhuang, Hefei (CN); Jun Xu, Hefei (CN); Nianan Pan, Hefei (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 329 days.

(21) Appl. No.: 17/040,512

(22) PCT Filed: Dec. 30, 2019

(86) PCT No.: PCT/CN2019/130012
§ 371 (c)(1),
(2) Date: Sep. 22, 2020

(87) PCT Pub. No.: WO2020/248583
PCT Pub. Date: Dec. 17, 2020

(65) Prior Publication Data
US 2022/0271667 A1    Aug. 25, 2022

(30) Foreign Application Priority Data
Jun. 11, 2019   (CN) .......................... 201910501039.4

(51) Int. Cl.
*H02M 3/158* (2006.01)
*H02M 3/155* (2006.01)
*H02M 1/32* (2007.01)

(52) U.S. Cl.
CPC ......... *H02M 3/1584* (2013.01); *H02M 1/322* (2021.05); *H02M 3/1552* (2021.05)

(58) Field of Classification Search
None
See application file for complete search history.

(56) References Cited

U.S. PATENT DOCUMENTS 11,418,114 B2 * 8/2022 Shi .................... H02M 3/158
2016/0329811 A1   11/2016 Du et al.
(Continued)

FOREIGN PATENT DOCUMENTS

CN    108667325 A    10/2018
CN    108768176 A    11/2018
(Continued)

OTHER PUBLICATIONS

International Search Report and Written Opinion (in Chinese) issued in PCT/CN2019/130012, dated Dec. 30, 2019; ISA/CN.
(Continued)

*Primary Examiner* — Jeffrey A Gblende
(74) *Attorney, Agent, or Firm* — Harness, Dickey & Pierce, P.L.C.

(57) ABSTRACT

A three-level Boost circuit is provided. The three-level Boost circuit includes: an input capacitor, an inductor, a first switch, a second switch, a first freewheeling diode, a second freewheeling diode, a flying capacitor, a balance capacitor, a charging diode, a clamp diode, a discharging diode and an output series capacitor bank. The output series capacitor bank includes multiple output capacitors connected in series, and has a first node and a second node; a potential of the first node is higher than a potential of a cathode of the charging diode, and a potential difference between a cathode of the second freewheeling diode and the second node does not exceed a withstand voltage of the second freewheeling diode.

19 Claims, 6 Drawing Sheets

(56) References Cited

U.S. PATENT DOCUMENTS

2018/0175726 A1* 6/2018 Petersen ............... H02M 3/07
2019/0214904 A1* 7/2019 Yu ...................... H02M 7/4837

FOREIGN PATENT DOCUMENTS

| CN | 108923632 A | 11/2018 |
| CN | 109039061 A | 12/2018 |
| CN | 109756115 A | 5/2019 |
| CN | 110165888 A | 8/2019 |
| EP | 2782235 A1 | 9/2014 |
| JP | 2014036491 A | 2/2014 |
| WO | WO-2012140781 A1 | 10/2012 |
| WO | WO-2013140611 A1 | 9/2013 |

OTHER PUBLICATIONS

First Indian Office Action regarding Application No. 202147052424 dated May 11, 2022.
Japanese Office Action regarding Patent Application No. 2021556942, dated Sep. 13, 2022.

* cited by examiner

THREE-LEVEL BOOST CIRCUIT AND MULTIPLE-OUTPUT PARALLEL SYSTEM

CROSS REFERENCE TO RELATED APPLICATIONS

The present application is a National phase application of PCT international patent application PCT/CN2019/130012, filed on Dec. 30, 2019 which claims priority to Chinese Patent Application No. 201910501039.4, titled "THREE-LEVEL BOOST CIRCUIT AND MULTIPLE-OUTPUT PARALLEL SYSTEM" filed on Jun. 11, 2019 with the Chinese Patent Office, both of which are incorporated herein by reference in their entireties.

FIELD

The present disclosure relates to the technical field of power electronics, and in particular to a three-level Boost circuit and a multiple-output parallel system.

BACKGROUND

With an increase of a voltage of a power electronic converter system, requirements of withstand voltage for related switching elements are gradually improved. However, due to influences from performances of the semiconductor process and so on, a development of high performance-cost ratio elements lags behind to some extent and related requirements of withstand voltage cannot be satisfied in a short term. Therefore, how to utilize an element with a low voltage level to realize a power conversion of a high voltage at a low cost becomes a hotspot of research. A proposed multi-level technology can solve the problem well.

The power conversion includes a voltage boost conversion, a voltage buck conversion, a buck-boost conversion and the like. The present disclosure concerns preventing a damage of a switching element due to an overvoltage during a process of performing a voltage step-up conversion.

SUMMARY

In view of this, a three-level Boost circuit and a multiple-output parallel system are provided according to the present disclosure to prevent a damage of a switching element due to an overvoltage.

A three-level Boost circuit is provided. The Boost circuit includes an input capacitor, an inductor, a first switch, a second switch, a first freewheeling diode, a second freewheeling diode, a flying capacitor, a balance capacitor, a charging diode, a clamp diode, a discharging diode and an output series capacitor bank.

The output series capacitor bank includes multiple output capacitors connected in series, and has a first node and a second node. A potential of the first node is higher than a potential of a cathode of the charging diode, and a potential difference between a cathode of the second freewheeling diode and the second node does not exceed a withstand voltage of the second freewheeling diode.

The input capacitor is connected in parallel with an input power supply. A negative electrode of the input capacitor is connected to a low potential end of the output series capacitor bank. A positive electrode of the input capacitor is coupled to a high potential end of the output series capacitor bank through a first terminal of the inductor, a second terminal of the inductor, an anode of the first freewheeling diode, a cathode of the first freewheeling diode, an anode of the second freewheeling diode and a cathode of the second freewheeling diode sequentially.

A second terminal of the inductor is coupled to the negative electrode of the input capacitor through a first terminal of the first switch, a second terminal of the first switch, a first terminal of the second switch and a second terminal of the second switch sequentially.

The cathode of the first freewheeling diode is coupled to the negative electrode of the input capacitor through a terminal of the flying capacitor, another terminal of the flying capacitor, an anode of the charging diode, a cathode of the charging diode, a terminal of the balance capacitor and another terminal of the balance capacitor sequentially.

The second terminal of the first switch is connected to the anode of the charging diode.

A cathode of the clamp diode is connected to the positive electrode of the second freewheeling diode and an anode of the clamp diode is connected to the second node.

A cathode of the discharging diode is connected to the first node and an anode of the discharging diode is connected to the cathode of the charging diode.

A capacitance difference between the flying capacitor and the balance capacitor does not exceed a predetermined value.

The first switch and the second switch are alternately switched on.

In an embodiment, the output series capacitor bank includes a first output capacitor, a second output capacitor, a third output capacitor and a fourth output capacitor, which are connected in series between a positive electrode and a negative electrode of the output series capacitor bank. Capacitances of the first output capacitor, the second output capacitor, the third output capacitor and the fourth output capacitor are same.

The first node is a positive electrode of the first output capacitor or a positive electrode of the second output capacitor, and the second node is a positive electrode of the fourth output capacitor.

A three-level Boost circuit is provided. The Boost circuit includes: an input capacitor, an inductor, a first switch, a second switch, a first freewheeling diode, a second freewheeling diode, a flying capacitor, a balance capacitor, a charging diode, a clamp diode, a discharging diode and an output series capacitor bank.

The output series capacitor bank includes multiple output capacitors connected in series, and has a first node and a second node. A potential of the first node is lower than a potential of an anode of the charging diode, and a potential difference between the second node and an anode of the second freewheeling diode does not exceed a withstand voltage of the second freewheeling diode.

The input capacitor is connected in parallel with an input power supply. A positive electrode of the input capacitor is connected to a high potential end of the output series capacitor bank. A negative electrode of the input capacitor is coupled to a low potential end of the output series capacitor bank through a first terminal of the inductor, a second terminal of the inductor, a cathode of the first freewheeling diode, an anode of the first freewheeling diode, a cathode of the second freewheeling diode and an anode of the second freewheeling diode sequentially.

A second terminal of the inductor is coupled to the positive electrode of the input capacitor through a first terminal of the first switch, a second terminal of the first switch, a first terminal of the second switch and a second terminal of the second switch sequentially.

The anode of the first freewheeling diode is coupled to the positive electrode of the input capacitor through a terminal of the flying capacitor, another terminal of the flying capacitor, a cathode of the charging diode, an anode of the charging diode, a terminal of the balance capacitor and another terminal of the balance capacitor sequentially.

The second terminal of the first switch is connected to the cathode of the charging diode.

An anode of the clamp diode is connected to the cathode of the second freewheeling diode and a cathode of the clamp diode is connected to the second node.

An anode of the discharging diode is connected to the first node and a cathode of the discharging diode is connected to the anode of the charging diode.

A capacitance difference between the flying capacitor and the balance capacitor does not exceed a predetermined value.

The first switch and the second switch are alternately switched on.

In an embodiment, the output series capacitor bank includes a first output capacitor, a second output capacitor, a third output capacitor and a fourth output capacitor, which are connected in series between a negative electrode and a positive electrode of the output series capacitor bank. Capacitances of the first output capacitor, the second output capacitor, the third output capacitor and the fourth output capacitor are same.

The first node is a negative electrode of the first output capacitor or a negative electrode of the second output capacitor.

The second node is a negative electrode of the fourth output capacitor.

A multiple-output parallel system is provided. The system includes multiple three-level Boost circuits described above. Inputs of the multiple three-level Boost circuits are independent and outputs of the multiple three-level Boost circuits are connected in parallel.

In an embodiment, each of the multiple three-level Boost circuits has an independent output series capacitor bank; or at least two three-level Boost circuits share an output series capacitor bank.

In the multiple-output parallel system, an overvoltage protection device is provided for each of the output series capacitor bank.

In a three-level Boost circuit where the output series capacitor bank is located, a terminal of the overvoltage protection device is connected to a connection point of the output series capacitor bank and the second freewheeling diode, and another terminal of the overvoltage protection device is connected to the second node. The overvoltage protection device includes a resistor and a third switch connected in series. The third switch acts according to a predetermined switch control strategy, such that an absolute value of a potential difference between the connection point and the second node does not exceed the withstand voltage of the second freewheeling diode.

In an embodiment, the switch control strategy is that: in a case that the absolute value of the potential difference is greater than P1, the third switch is switched on; and in a case that the absolute value of the potential difference is less than P2, the third switch is switched off. P1 and the P2 are predetermined voltage values and P1>P2.

In an embodiment, after an output voltage Vout is established and in a case that a nonoperational three-level Boost circuit satisfies Vin≥2*V4, a control strategy of the nonoperational three-level Boost circuit is that: the first switch and the second switch are controlled to be alternately switched on.

Vin represents a voltage of the input power supply, and V1 represents the absolute value of the potential difference between the second node, and the connection point of the output series capacitor bank and the input capacitor, V4=Vout−V1.

In an embodiment, after an output voltage Vout is established, in a case that an input voltage of a nonoperational three-level Boost circuit Vin is less than a predetermined minimum input voltage Vinmin, the nonoperational three-level Boost circuit does not start to operate; and in a case that the nonoperational three-level Boost circuit satisfies Vinmin≤Vin<2V4, a control strategy of the nonoperational three-level Boost circuit is that: the second switch maintains being switched off, and the first switch is switched on and switched off until Vc1≥V4; then the first switch and the second switch are controlled to be alternately switched on.

Vc1 represents a voltage of the flying capacitor, and V1 represents the absolute value of the potential difference between the second node, and the connection point of the output series capacitor bank and the input capacitor, V4=Vout−V1.

In an embodiment, after an output voltage Vout is established and in a case that an input voltage of the nonoperational three-level Boost circuit changes from a short circuit voltage to Vin and V4<Vin<a predetermined minimum input voltage Vinmin, a control strategy of the nonoperational three-level Boost circuit is that: the first switch and the second switch are controlled to be alternately switched on.

V1 represents the absolute value of the potential difference between the second node and the connection point of the output series capacitor bank and the input capacitor, V4=Vout−V1.

It can be seen from above technical solutions that, before an output voltage of a three-level Boost circuit is established, divided voltages of a flaying capacitor C1 and a balance capacitor C2 are equal and increase over time. When voltages of C1 and C2 rise to approach Vout/2, a charging diode D11 is reversely turned off and an output voltage Vout is established. After the output voltage Vout is established, C1 varies with Vout while the voltage of C2 is stabilized and close to Vout/2. C2 only provides a voltage support and current does not flow into C2. As long as a capacitance value of C1 is equal to a capacitance value of C2, a divided voltage of C1 is substantially equal to a divided voltage of C2 when a high voltage is inputted, thereby avoiding damages of a first switch K1 and a second switch K2 duo to an overvoltage.

BRIEF DESCRIPTION OF THE DRAWINGS

In order to more clearly describe the technical solutions in the embodiments of the present disclosure or the technical solutions in the conventional technology, drawings to be used in the description of the embodiments of the present disclosure or the conventional technology are briefly described hereinafter. It is apparent that the drawings described below show merely the embodiments of the present disclosure, and those skilled in the art may obtain other drawings according to the provided drawings without any creative effort.

DETAILED DESCRIPTION OF EMBODIMENTS

Technical solutions of embodiments of the present disclosure are clearly and completely described below in conjunction with the drawings of the embodiments of the present disclosure. Apparently, the embodiments described in the following are only some embodiments of the present disclosure, rather than all the embodiments. Any other embodiments obtained by those skilled in the art based on the embodiments in the present disclosure without any creative effort fall within the protection scope of the present disclosure.

Figure 1:
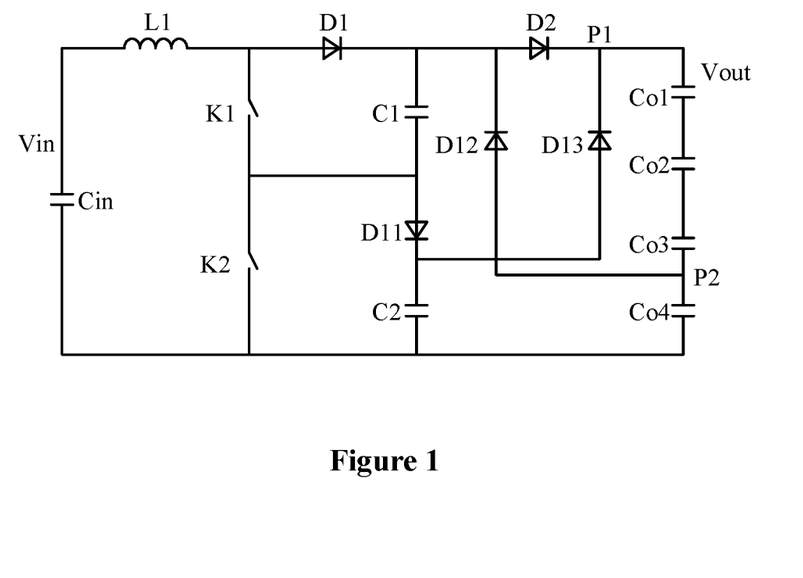
FIG. 1 is a schematic structural diagram of a three-level Boost circuit according to an embodiment of the present disclosure.

Referring to FIG. 1, a three-level Boost circuit is disclosed according to an embodiment of the present disclosure. The Boost circuit includes: an input capacitor Cin, an inductor L1, a first switch K1, a second switch K2, a first freewheeling diode D1, a second freewheeling diode D2, a flying capacitor C1, a balance capacitor C2, a charging diode D11, a clamp diode D12, a discharging diode D13 and an output series capacitor bank Co (the reference numeral "Co" is not shown in FIG. 1).

The output series capacitor bank Co includes multiple output capacitors connected in series, and has a first node P1 and a second node P2. A potential of the first node P1 is higher than a potential of a cathode of D11, and a potential difference between a cathode of D2 and the second node P2 does not exceed a withstand voltage of D2 (FIG. 1 schematically shows that the output series capacitor bank Co includes a first output capacitor Co1, a second output capacitor Co2, a third output capacitor Co3 and a fourth output capacitor Co4, which are connected in series between a positive electrode and a negative electrode of the output series capacitor bank Co, and Co1=Co2=Co3=Co4; the first node P1 may be set as a positive electrode of Co1 and the second node P2 may be set as a positive electrode of Co4).

Cin is connected in parallel with an input power supply. A cathode of Cin is connected to a low potential end of the output series capacitor bank Co. A positive electrode of Cin is coupled to a high potential end of the output series capacitor bank Co through a first terminal of L1, a second terminal of L1, an anode of D1, a cathode of D1, an anode of D2 and a cathode of D2 sequentially. A potential difference between the high potential end and the low potential end of the output series capacitor bank Co is an output voltage Vout.

A second terminal of L1 is coupled to the negative electrode of Cin through a first terminal of K1, a second terminal of K1, a first terminal of K2 and a second terminal of K2 sequentially.

The cathode of D1 is coupled to the negative electrode of Cin through a terminal of C1, another terminal of C1, an anode of D11, a cathode of D11, a terminal of C2 and another terminal of C2 sequentially.

The second terminal of K1 is connected to the anode of D11.

A cathode of D12 is connected to the anode of D2 and an anode of D12 is connected to the second node P2.

A cathode of D13 is connected to the first node P1 and an anode of the D13 is connected to the cathode of D11.

A capacitance difference between C1 and C2 does not exceed a predetermined value to ensure a capacitance value of C1 is equal to or approximately equal to a capacitance value of C2.

K1 and the K2 are alternately switched on.

An operation principle of the circuit shown in FIG. 1 is as follows.

Figure 2:
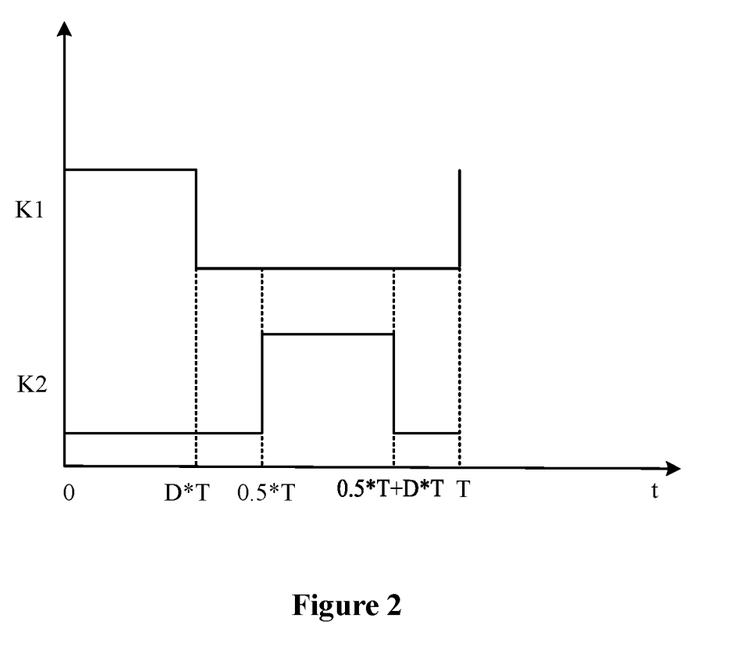
FIG. 2 is a timing diagram of K1 and K2 in the three-level Boost circuit shown in FIG. 1.

K1 and the K2 are alternately switched on, and duty cycles of both K1 and the K2 are D. Supposing 0<D<0.5, a timing diagram of K1 and the K2 is as shown in FIG. 2. In one switching period T, when 0<t<D*T, K1 is switched on and K2 is switched off; when D*T<t<0.5*T and 0.5*T+D*T<t<T, both K1 and K2 are switched off; and when 0.5*T<t<0.5*T+D*T, K2 is switched on and K1 is switched off.

In a case that the circuit shown in FIG. 1 starts but an output voltage is not established, the circuit shown in FIG. 1 operates successively in following mode 1 to mode 3 in one switching period T.

Figure 3A:
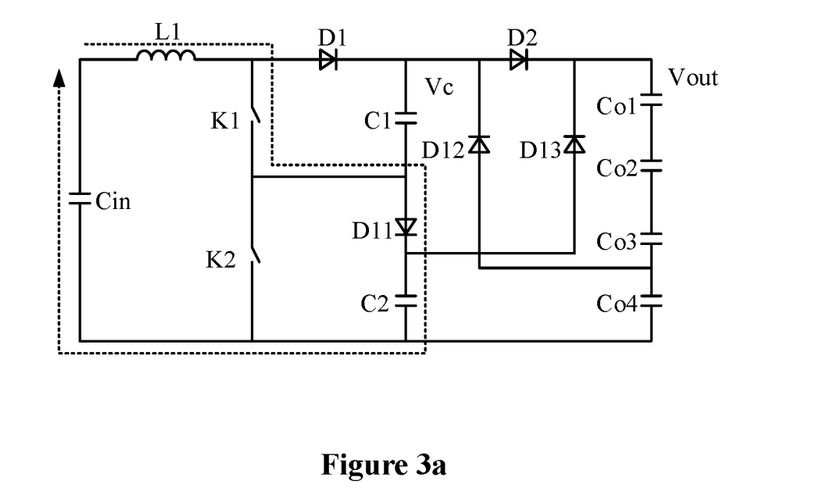
FIG. 3a, FIG. 3b and FIG. 3c are schematic diagrams of current trends of the three-level Boost circuit shown in FIG. 1 respectively in three different modes before an output voltage is established.

Mode 1: K1 is switched on and K2 is switched off. In this case, a current trend of a loop is as shown in FIG. 3a, that is, Cin→L1→K1→D11→C2→Cin, C2 is charged.

Figure 3B:
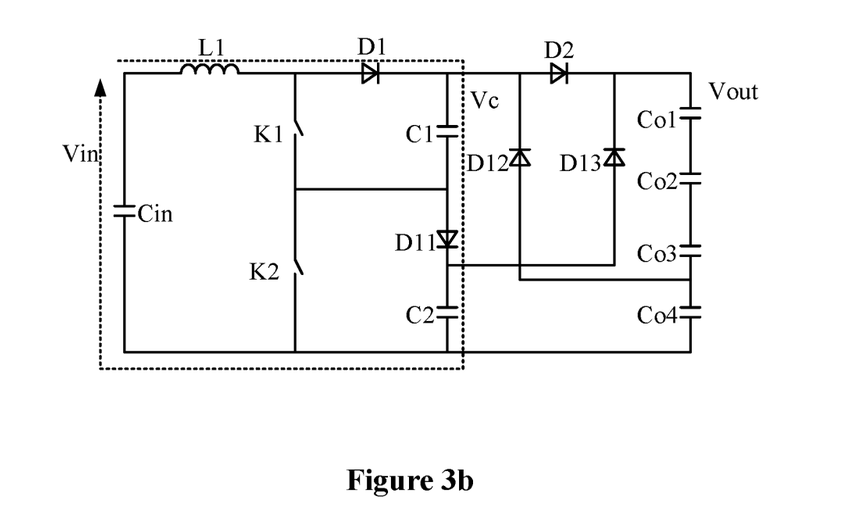

Mode 2: both K1 and K2 are switched off. In this case, a current trend of the loop is as shown in FIG. 3b, that is, Cin→L1→D1→C1→D11→C2→Cin, C1 and C2 are charged simultaneously.

Figure 3C:
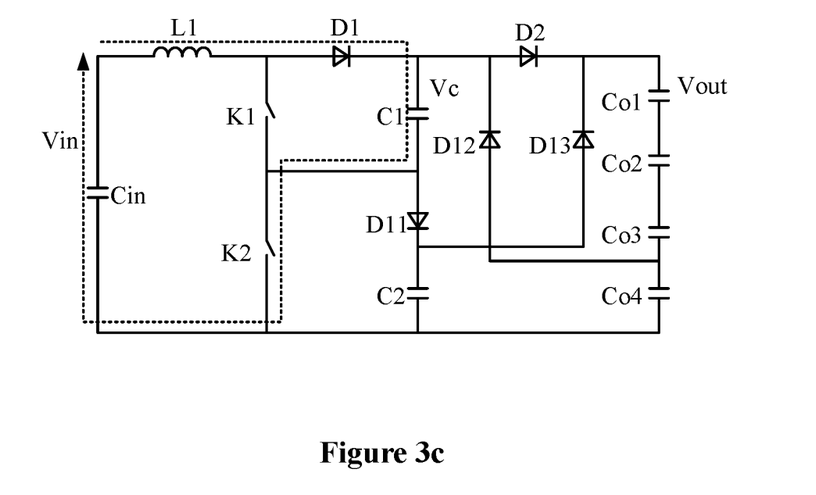

Mode 3: K2 is switched on and K1 is switched off. In this case, a current trend of the loop is as shown in FIG. 3c, that is, Cin→L1→D1→C1→K2→Cin, C1 is charged.

Switched-on time of K1 and K2 in one switching period T is same and equals to D*T. Therefore, in a case that the circuit shown in FIG. 1 starts but an output voltage is not established, divided voltages of C1 and C2 are equal and increase over operation time t.

At an instant when voltages of C1 and C2 increase to Vout/2, the circuit operates in the mode 1. C2 is charged, the voltage of C2 increases to a value slightly higher than Vout/2 while a voltage of the negative electrode of the C1 remains Vout/2, such that D11 is reversely turned off. That is, in a case that D11 is reversely turned off, the output voltage of the circuit shown in FIG. 1 is established.

In a case that the output voltage of the circuit shown in FIG. 1 is established, the circuit shown in FIG. 1 operates successively in following mode 4 to mode 6 in one switching period T.

Figure 4A:
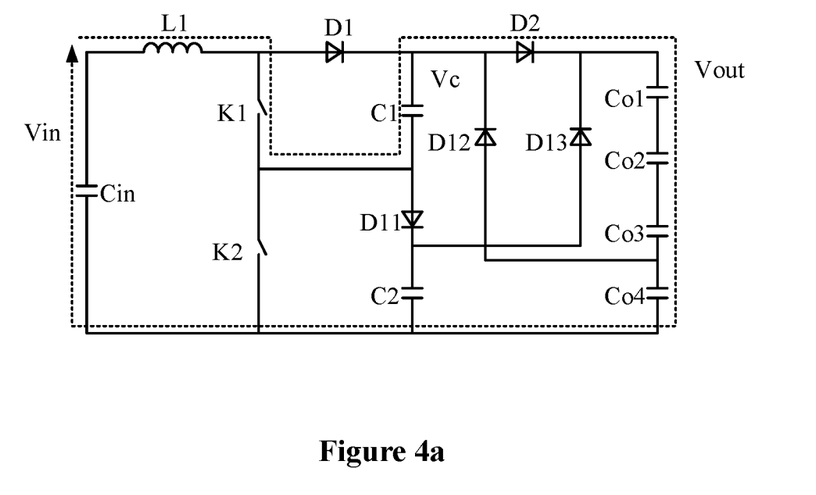
FIG. 4a and FIG. 4b are schematic diagrams of current trends of the three-level Boost circuit shown in FIG. 1 respectively in two different modes after an output voltage is established.

Mode 4: K1 is switched on and K2 is switched off. In this case, a current trend of the loop is as shown in FIG. 4a, that is, Cin→L1→K1→C1→D2→Co→Cin; C1 discharges. In a case that forward switched-on voltage drops of the diode and the switch and voltage fluctuation of the capacitor are neglected, a voltage across the inductor L1 is Vin+Vc1−Vout. In which, Vin represents a voltage of the input power supply, Vc1 represents a voltage of C1 and Vout represents the output voltage.

Figure 4B:
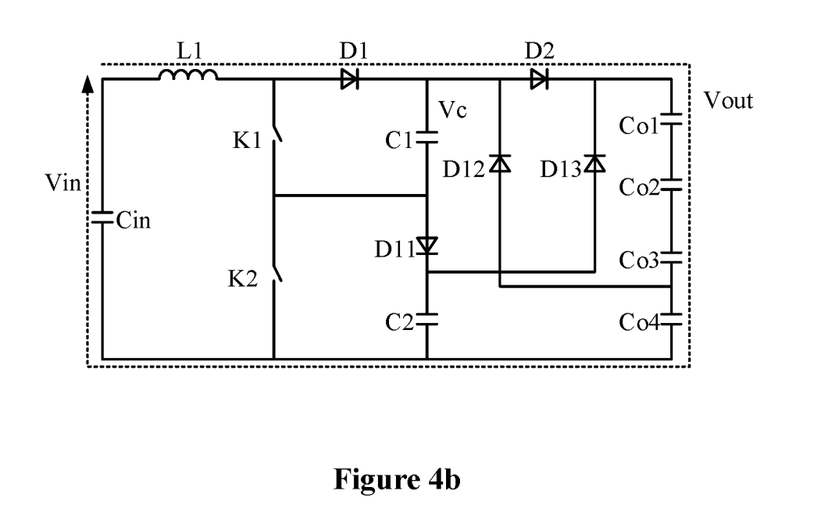

Mode 5: both K1 and K2 are switched off. In this case, a current trend of the loop is as shown in FIG. 4b, that is, Cin→L1→D1→D2→Co→Cin. In a case that forward switched-on voltage drops of the diode and the switch and the voltage fluctuation of the capacitor are neglected, a voltage across the inductor L1 is Vin-Vout.

Mode 6: K2 is switched on and K1 is switched off. In this case, a current trend of the loop is as shown in FIG. 3c, that is, Cin→L1→D1→C1→K2→Cin; C1 is charged. In a case that the forward switched-on voltage drops of the diode and the switch and the voltage fluctuation of the capacitor are neglected, a voltage across the inductor L1 is Vin−Vc1.

Based on the mode 4 to the mode 6 and according to the voltage-second balancing principle, the following equation can be obtained:

$$(Vin+Vc-Vout)*D*T+(Vin-Vout)*(0.5-D)=0$$

$$Vout = \frac{Vin}{1-D}$$

is calculated according to the above equation, thereby achieving a voltage boost conversion.

Since switched-on time of both K1 and K2 in one switching period T is equal to D*T and a value of average current of the inductor L1 is constant, Vin+Vc1−Vout=Vin−Vc1 and thus Vc1=Vout/2 is obtained by calculating. It can be seen that voltage stresses of both K1 and K2 are Vout/2 after the output voltage is established.

According to the above description, before the output voltage of the circuit shown in FIG. 1 is established, divided voltages of C1 and C2 are equal and increase over operation time t. When voltages of C1 and C2 rise to approach Vout/2, D11 is reversely turned off and the output voltage is established. After the output voltage is established, C1 varies with Vout. C2 only provides a voltage support and current does not flow into C2. As long as a capacitance value of C1 is equal to a capacitance value of C2, a divided voltage of C1 is substantially equal to a divided voltage of C2 when a high voltage is inputted, thereby avoiding damages of K1 and K2 duo to an overvoltage. That is, damages of K1 or K2 due to subjecting an excessive voltage caused by serious inequality in divided voltages of C1 and C2 are avoided.

Analysis is performed by taking 0<D<0.5 as an example. An analysis result in a case of 0.5<D<1 is the same as the analysis result in a case of 0<D<0.5 (namely, voltages of respective elements in the circuit do not change) and is not repeated herein.

Moreover, it should be noted that the circuit shown in FIG. 1 can also avoid damages of K1 and K2 due to an overvoltage in a scenario that the output voltage fluctuates. Specific analyses are as follows.

Assuming that the output voltage Vout is stable at Vo1 initially; in a next stage, the output voltage Vout is stable at Vo2 and Vo1<Vo2, in this case Vc1=Vc2=Vo2/2, where Vc2 represents a voltage of C2; in a next stage, the output voltage Vout is stable at Vo1 again, in this case Vc1=Vo1/2, and C2 scarcely discharges and thus Vc2 remains Vo2/2; in a next stage, the output voltage Vout is stable at Vo2 again, Vc1 increases to Vo2/2 with a variation of an output and a voltage of C2 increases to Vo2/2+(Vo2−Vo1/2−Vo2/2)/2=3*Vo2/4−Vo1/4 in a next stage, the output voltage Vout is stable at Vo1 again, . . . , and so on. Therefore, the voltage of C2 increases gradually and is stable at Vo2−Vo1/2 finally. It can be seen that the voltage of C2 does not increase unlimitedly, and C2 is not damaged due to an overvoltage as long as a high withstand-voltage capacitor is selected. Moreover, although the voltage of C2 is high in this case, the voltage of C1 changes with the output voltage Vout/2 in a real time manner and D11 is reversely turned off. Therefore, the high voltage of C2 does not apply to K2. In this case, voltage stresses of both K1 and K2 are Vout/2, without a risk of damage due to an overvoltage.

Figure 5:
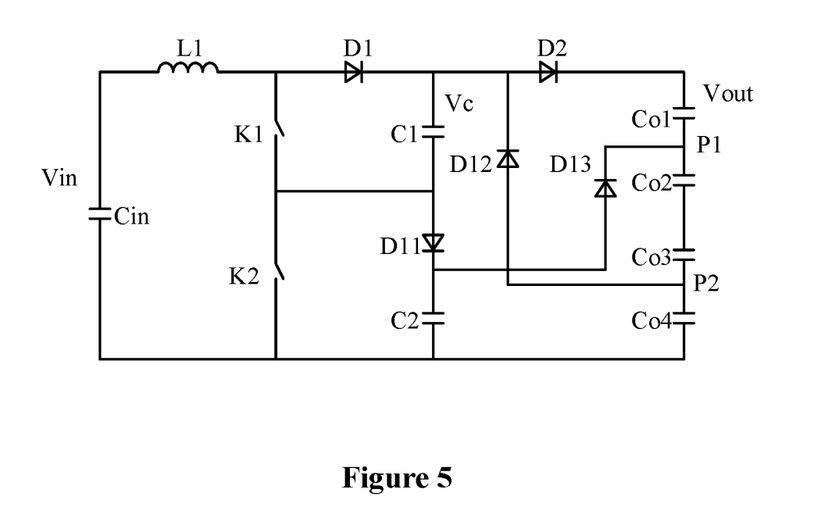
FIG. 5 is a schematic structural diagram of another three-level Boost circuit according to an embodiment of the present disclosure.

Finally, it should be noted that in the circuit shown in FIG. 1, a position of the first node P1 is selected, so that D13 provides a discharge path for C2 only when the voltage of the output capacitor bank is lower than the voltage of C2 and C2 does not discharge through D13 at other time instants. Therefore, in addition to being connected to a positive electrode of Co1 as shown in FIG. 1, a cathode of D13 may be connected to a positive electrode of Co2 as shown in FIG. 5. A position of the second node P2 is selected so that D2 is not damaged due to an overvoltage after D12 is switched on. Practically, the case that the output series capacitor bank Co includes four output capacitors Co1 to Co4 in FIG. 1 and FIG. 5 is only schematic. In a case that functions of D13 and D12 can be realized, Co may include a different number of output capacitors with other capacitances. The number and capacitances of output capacitors are not limited to those shown in FIG. 1 and FIG. 5. Moreover, in this case, operation principles of the obtained corresponding three-level Boost circuits with different Co structures are same, and the operation principles are not repeated herein.

Figure 6:
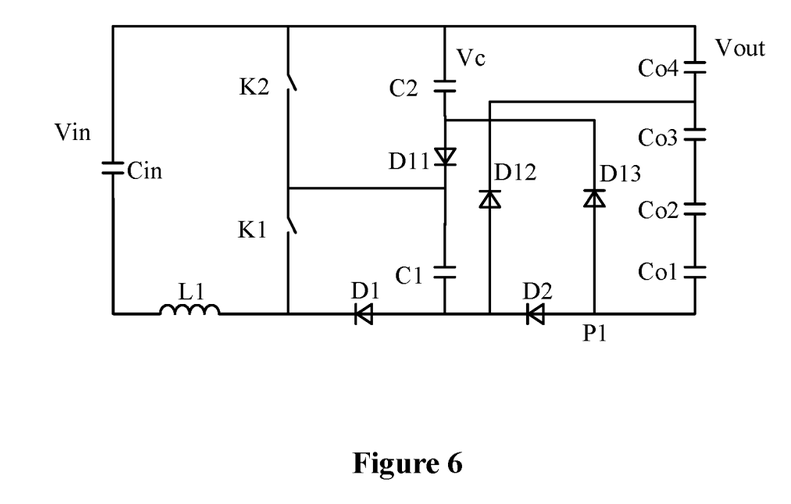
FIG. 6 is a schematic structural diagram of another three-level Boost circuit according to an embodiment of the present disclosure.

Referring to FIG. 6, another three-level Boost circuit is provided according to an embodiment of the present disclosure. The three-level Boost circuit shown in FIG. 6 is a mirror image of the circuit shown in FIG. 1. The three-level Boost circuit shown in FIG. 6 includes an input capacitor Cin, an inductor L1, a first switch K1, a second switch K2, a first freewheeling diode D1, a second freewheeling diode D2, a flying capacitor C1, a balance capacitor C2, a charging diode D11, a clamp diode D12, a discharging diode D13 and an output series capacitor bank Co.

The output series capacitor bank Co includes multiple output capacitors connected in series, and has a first node P1 and a second node P2. A potential of the first node P1 is lower than a potential of an anode of D11, and a potential difference between the second node P2 and an anode of D2 does not exceed a withstand voltage of D2 (FIG. 1 schematically shows that the output series capacitor bank Co includes a first output capacitor Co1, a second output capacitor Co2, a third output capacitor Co3 and a fourth output capacitor Co4, which are connected in series between a negative electrode and a positive electrode of the output series capacitor bank Co, and Co1=Co2=Co3=Co4; the first node P1 may be set as a negative electrode of Co1 and the second node P2 may be set as a negative electrode of Co4).

Cin is connected in parallel with an input power supply. A positive electrode of Cin is connected to a high potential end of the output series capacitor bank Co. A negative electrode of Cin is coupled to a low potential end of the output series capacitor bank Co through a first terminal of L1, a second terminal of L1, a cathode of D1, an anode of D1, a cathode of D2 and an anode of D2 sequentially.

A second terminal of L1 is coupled to the positive electrode of Cin through a first terminal of K1, a second terminal of K1, a first terminal of K2 and a second terminal of K2 sequentially.

The anode of D1 is coupled to the positive electrode of Cin through a terminal of C1, another terminal of C1, a cathode of D11, an anode of D11, a terminal of C2 and another terminal of C2 sequentially.

The second terminal of K1 is connected to the cathode of D11.

An anode of the D12 is connected to the cathode of D2 and a cathode of D12 is connected to the second node P2.

An anode of the D13 is connected to the first node P1 and a cathode of D13 is connected to an anode of D11.

A capacitance difference between C1 and C2 does not exceed a predetermined value to ensure that a capacitance value of C1 is equal to or approximately equal to a capacitance value of C2.

K1 and the K2 are alternately switched on.

An operation principle of the circuit shown in FIG. 6 can be similarly obtained with reference to analysis of the circuit shown in FIG. 1, and the operation principle is not repeated herein.

Figure 7:
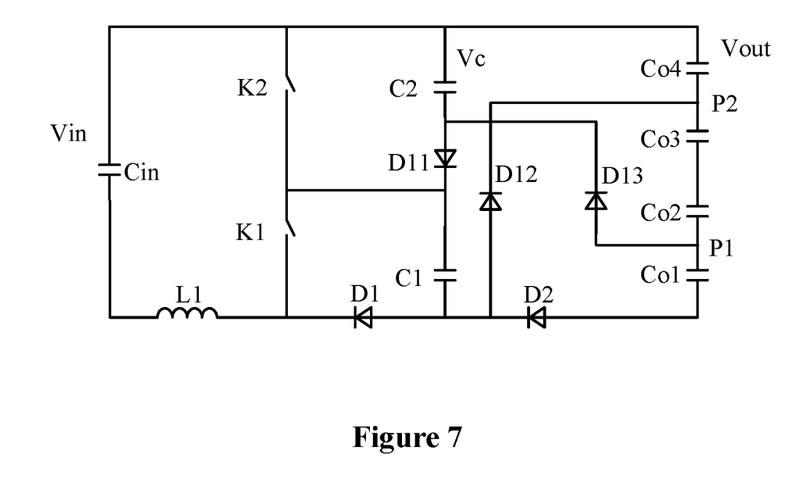
FIG. 7 is a schematic structural diagram of another three-level Boost circuit according to an embodiment of the present disclosure.

In the circuit shown in FIG. 6, a position of the first node P1 is selected, so that D13 provides a discharge path for C2 only when the voltage of the output capacitor bank is lower than the voltage of C2 and C2 does not discharge through D13 at other time instants. Therefore, in addition to being connected to a negative electrode of Co1 as shown in FIG. 6, an anode of D13 may be connected to a negative electrode of Co2 as shown in FIG. 7. A position of the second node P2 is selected so that D2 is not damaged due to an overvoltage after D12 is switched on. Practically, FIG. 6 and FIG. 7 schematically show that the output series capacitor bank Co includes four output capacitors Co1 to Co4. In a case that functions of D13 and D12 can be realized, Co may include a different number of output capacitors with other capacitances. The number and capacitances of output capacitors are not limited to those shown FIG. 6 and FIG. 7. Moreover, in this case, operation principles of the obtained corresponding three-level Boost circuits with different Co structures are same and the operation principles are not repeated herein.

In any one of embodiments disclosed above, K1 and K2 may be mechanical switches or inversion transistors, and types of K1 and K2 are not limited.

Figure 8:
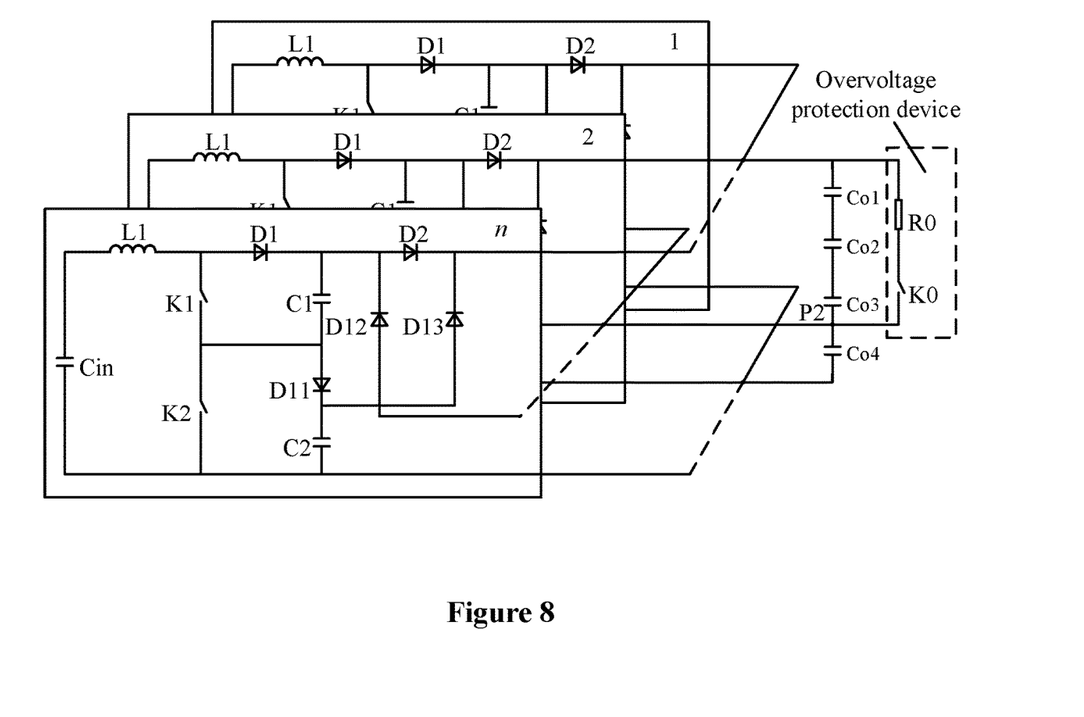
FIG. 8 is a schematic structural diagram of a multiple-output parallel system according to an embodiment of the present disclosure.

Referring to FIG. 8, a multiple-output parallel system is further disclosed according to an embodiment of the present disclosure. The multiple-output parallel system includes n three-level Boost circuits, where n≥2. Inputs of the n three-level Boost circuits are independent and outputs of the n three-level Boost circuits are connected in parallel. The three-level Boost circuit is any one of three-level Boost circuits disclosed above. FIG. 8 schematically shows that the multiple-output parallel system includes n three-level Boost circuits as shown in FIG. 1.

In an embodiment, in the multiple-output parallel system having any one of three-level Boost circuits disclosed above, each three-level Boost circuit may have an independent output series capacitor bank Co; or at least two three-level Boost circuits share an output series capacitor bank Co. FIG. 8 schematically shows that all three-level Boost circuits share an output series capacitor bank Co.

However, there is a risk of overvoltage for D2 in the multiple-output parallel system having any one of three-level Boost circuits disclosed above under a specific operation condition. The specific operation condition is as follows: a three-level Boost circuits operate normally; b three-level Boost circuits do not operate and have a short circuit input or a low input voltage (a≥1, b≥1, a+b≤n).

Figure 9:
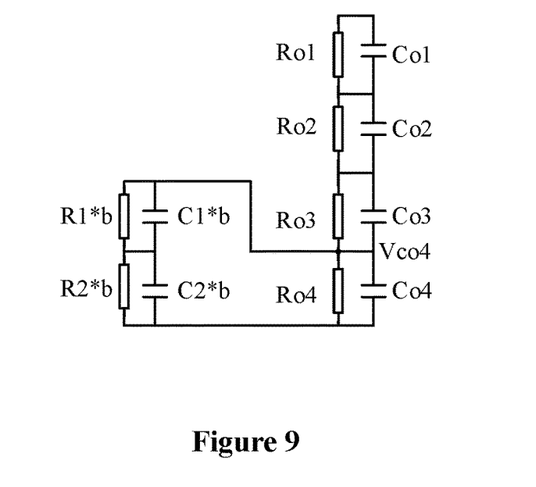
FIG. 9 shows a resistance capacity voltage division equivalent circuit consisting of b nonoperational three-level Boost circuits with a short circuit input or a low input voltage according to an embodiment of the present disclosure.

Taking FIG. 8 as an example, under the specific operation condition, since grading resistors are respectively connected in parallel with Co1 to Co4, C1 and C2 in practice, Co4 in the b three-level Boost circuits charges C1 and C2 through D12 and a simplified equivalent circuit is as shown in FIG. 9. Voltages of Co4 in the b three-level Boost circuits are dependent on a grading resistor Ro1 of Co1, a grading resistor Ro2 of Co2, a grading resistor Ro3 of Co3, a grading resistor Ro4 of Co4, a grading resistor R1*b of C1 and a grading resistor R2*b of C2. In general, Ro1=Ro2=Ro3=Ro4, R1=R2. In this case, $$Vco4 = \frac{Vout*((R1*2*b)//Ro4)}{((R1*2*b)//Ro4) + 3*Ro4} < \frac{Vout}{4}$$

a voltage to withstand of D2 in the b three-level Boost circuits is Vout−Vco4>¾Vout, resulting in that D2 is damaged with a great probability. Therefore, an overvoltage protection device is required to be added to ensure that D2 cannot be damaged due to an overvoltage. Still referring to FIG. 8, the overvoltage protection device is connected between the positive electrode of Co1 and the positive electrode of Co4, and includes a resistor R0 and a third switch K0 that are connected in series. The third switch is controlled to be switched on or off, so that Vout−Vco4 does not exceed a withstand voltage of D2. The third switch K0 may be controlled according to the following strategy for example. In a case that Vout−Vco4>P1 (P1 is a predetermined voltage) is satisfied, the third switch K0 is switched on, such that Vco4 is increased, thereby avoiding a damage of D2 in the b three-level Boost circuits due to an overvoltage; in a case that Vout−Vco4<P2 (P2 is a predetermined voltage, P1>P2), the third switch K0 is switched off, such that Vco4 is decreased and circuit losses are reduced.

The overvoltage protection device applied in FIG. 8 is applied to the multiple-output parallel system having any one of three-level Boost circuits disclosed above, and a corresponding solution is as follows. One overvoltage protection device is respectively provided for each Co. In a three-level Boost circuit where the present Co is located, a terminal of the overvoltage protection device is connected to a connection point of the present Co and D2, and another terminal of the overvoltage protection device is connected to the second node P2. The overvoltage protection device includes a resistor R0 and a third switch K0 connected in series. The third switch K0 is controlled to be switched on or off, so that an absolute value of a potential difference between the connection point and the second node P2 does not exceed the withstand voltage of D2. The third switch K0 may be controlled according to the following strategy for example. In a case that the absolute value of the potential difference is greater than P1 (P1 is a predetermined voltage), the third switch k0 is switched on; in a case that the absolute value of the potential difference is less than P2 (P2 is a predetermined voltage, P1>P2), the third switch k0 is switched off.

In an embodiment, in the multiple-output parallel system having any one of three-level Boost circuits disclosed above, K0 may be a mechanical switch or an inversion transistor, and a type of K0 is not limited.

In an embodiment, in the multiple-output parallel system having any one of three-level Boost circuits disclosed above, in a case that the output voltage Vout is established (that is, at least one three-level Boost circuit operates normally), the nonoperational three-level Boost circuit under the following operation conditions is controlled as follows.

In operation condition 1, the nonoperational circuit satisfies Vin≥2*V4 (V1 represents the absolute value of the potential difference between P2, and the connection point of Co and Cin, V4=Vout−V1), thus K1 and K2 are controlled to be switched on alternately. In FIG. 8, V4 is a voltage of Co4.

In operation condition 2, the nonoperational circuit satisfies Vin<2*V4 and Vc1=Vc2=Vin/2. In this case, in the nonoperational circuit, Vc1=Vin/2<V4. If K1 and K2 are directly controlled to be alternately switched on, the voltage of V4 charges C1 through a D12-C1-K2 loop, since a voltage of V4 is higher than a voltage of C1 when K2 is switched on. High current flows through the loop due to a low impedance of the loop, resulting in damages of D11 and K2. Therefore, C1 is required to be charged firstly. K1 and K2 are controlled to be alternately switched on after the voltage of C1 is higher than the voltage of V4. A process of charging C1 is analyzed below.

K2 remains being switched off, and K1 is switched on and switched off. Specifically, at an instant when K1 is switched on, a sum of voltages of C1 and C2 is lower than an output voltage Vout and an input current charges C2 through an L1-K1-D11-C2 loop, such that a voltage of C2 is increased. At an instant when K1 is switched off, the input current charges C1 and C2 simultaneously though an L1-D1-C1-D11-C2 loop and voltages of C1 and C2 are increased simultaneously. As K1 is switched on and switched off, voltages of C1 and C2 are increased continuously. When the voltage of C2 is increased to an input voltage Vin, no inductor current flows into C2 even though K1 is switched on. Then, K1 is switched off, no inductor current flows into C1 to charge C1, and thus the voltage of C1 is not increased anymore. Therefore, one of the following results may be achieved finally in a case that K1 is switched on and switched off until 1) Vc1>V4, Vc2<Vin; or 2) Vc1<V4, Vc2=Vin. For the result 1), K1 and the K2 are controlled to be alternately switched on; for the result 2), the circuit does not meet a condition of normal startup, and thus the circuit does not start to operate.

In view of result 1) and result 2), a minimum input voltage Vinmin is predetermined according to the present embodiment. In a case that an input voltage Vin is lower than the predetermined minimum input voltage Vinmin (generally, Vinmin=1.43*V4, as shown in FIG. 8), the result 2) is achieved, that is, the circuit does not start to operate. In a case that $Vin_{min}$≤Vin<2V4, the result 1) is achieved, that is, K2 remains being switched off and K1 is switched on and switched off until Vc1≥V4; then K1 and K2 are controlled to be alternately switched on.

In an embodiment, when Vc1≥V4, control may be performed according to another strategy and it is unnecessary to immediately control K1 and K2 to be alternately switched on. For example, K2 remains being switched on, and K1 is switched on and switched off; and then K1 and K2 are controlled to be alternately switched on when C1 is charged to a certain voltage.

Operation condition 3 is an extremely special case. In the operation condition 3, the circuit can be started to operate even though an input voltage is lower than Vinmin. The operation condition 3 is described as follows. An input voltage of the nonoperational circuit changes from a short circuit voltage to Vin, V4<Vin<Vinmin. Before Vin is inputted, a voltage of V4 charges C1 to V4 through a D12-C1-K1-L1 loop; C2 is shorted and a voltage of C2 is 0, that is, Vc1=V4, Vc2=0. After Vin is inputted, C1 and C2 are charged, voltages of C1 and C2 are Vc1=(Vin−V4)/2+V4, Vc2=(Vin−V4)/2. In this case, Vc1>V4 and K1 and K2 may be controlled to be alternately switched on.

The embodiments in this specification are described in a progressive way, each of which emphasizes the differences from others, and the same or similar parts among the embodiments can be referred to each other. Since the device disclosed in the embodiments corresponds to the method therein, the description of the device is relatively simple. For relevant matters, one may refer to the description of the method.

In the present disclosure, relational terms such as "first" and "second" are merely used to distinguish one entity or operation from another entity or operation, but do not indicate or imply an actual relationship or order of these entities or operations. Moreover, terms of "include", "comprise" or any other variants are intended to be non-exclusive. Therefore, a process, method, article or device including multiple elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

With the description of the embodiments disclosed above, those skilled in the art may implement or use technical solutions of the present disclosure. Numerous modifications to the embodiments are apparent to those skilled in the art, and the general principles defined herein may be implemented in other embodiments without departing from the spirit or scope of the present disclosure. Therefore, the present disclosure may not be limited to the embodiments described herein, but should comply with the widest scope consistent with the principles and novel features disclosed herein.

The invention claimed is:

1. A three-level Boost circuit, comprising an input capacitor, an inductor, a first switch, a second switch, a first freewheeling diode, a second freewheeling diode, a flying capacitor, a balance capacitor, a charging diode, a clamp diode, a discharging diode and an output series capacitor bank, wherein the output series capacitor bank comprises a plurality of output capacitors connected in series, and has a first node and a second node; a potential of the first node is higher than a potential of a cathode of the charging diode, and a potential difference between a cathode of the second freewheeling diode and the second node does not exceed a withstand voltage of the second freewheeling diode;

the input capacitor is connected in parallel with an input power supply; a negative electrode of the input capacitor is connected to a low potential end of the output series capacitor bank; a positive electrode of the input capacitor is coupled to a high potential end of the output series capacitor bank through a first terminal of the inductor, a second terminal of the inductor, an anode of the first freewheeling diode, a cathode of the first freewheeling diode, an anode of the second freewheeling diode and a cathode of the second freewheeling diode sequentially;

a second terminal of the inductor is coupled to the negative electrode of the input capacitor through a first terminal of the first switch, a second terminal of the first switch, a first terminal of the second switch and a second terminal of the second switch sequentially;

the cathode of the first freewheeling diode is coupled to the negative electrode of the input capacitor through a terminal of the flying capacitor, another terminal of the flying capacitor, an anode of the charging diode, a cathode of the charging diode, a terminal of the balance capacitor and another terminal of the balance capacitor sequentially;

the second terminal of the first switch is connected to the anode of the charging diode;

a cathode of the clamp diode is connected to the anode of the second freewheeling diode and an anode of the clamp diode is connected to the second node;

a cathode of the discharging diode is connected to the first node and an anode of the discharging diode is connected to the cathode of the charging diode;

a capacitance difference between the flying capacitor and the balance capacitor does not exceed a predetermined value; and the first switch and the second switch are alternately switched on.

2. The three-level Boost circuit according to claim 1, wherein the output series capacitor bank comprises a first output capacitor, a second output capacitor, a third output capacitor and a fourth output capacitor, which are connected in series between a positive electrode and a negative electrode of the output series capacitor bank; capacitances of the first output capacitor, the second output capacitor, the third output capacitor and the fourth output capacitor are same; and the first node is a positive electrode of the first output capacitor or a positive electrode of the second output capacitor, and the second node is a positive electrode of the fourth output capacitor.

3. A three-level Boost circuit, comprising an input capacitor, an inductor, a first switch, a second switch, a first freewheeling diode, a second freewheeling diode, a flying capacitor, a balance capacitor, a charging diode, a clamp diode, a discharging diode and an output series capacitor bank, wherein the output series capacitor bank comprises a plurality of output capacitors connected in series, and has a first node and a second node; a potential of the first node is lower than a potential of an anode of the charging diode, and a potential difference between the second node and an anode of the second freewheeling diode does not exceed a withstand voltage of the second freewheeling diode;

the input capacitor is connected in parallel with an input power supply; a positive electrode of the input capacitor is connected to a high potential end of the output series capacitor bank; a negative electrode of the input capacitor is coupled to a low potential end of the output series capacitor bank through a first terminal of the inductor, a second terminal of the inductor, a cathode of the first freewheeling diode, an anode of the first freewheeling diode, a cathode of the second freewheeling diode and an anode of the second freewheeling diode sequentially;

a second terminal of the inductor is coupled to the positive electrode of the input capacitor through a first terminal of the first switch, a second terminal of the first switch, a first terminal of the second switch and a second terminal of the second switch sequentially;

the anode of the first freewheeling diode is coupled to the positive electrode of the input capacitor through a terminal of the flying capacitor, another terminal of the flying capacitor, a cathode of the charging diode, an anode of the charging diode, a terminal of the balance capacitor and another terminal of the balance capacitor sequentially;

the second terminal of the first switch is connected to the cathode of the charging diode;

an anode of the clamp diode is connected to the cathode of the second freewheeling diode and a cathode of the clamp diode is connected to the second node;

an anode of the discharging diode is connected to the first node and a cathode of the discharging diode is connected to the anode of the charging diode;

a capacitance difference between the flying capacitor and the balance capacitor does not exceed a predetermined value; and the first switch and the second switch are alternately switched on.

4. The three-level Boost circuit according to claim 3, wherein the output series capacitor bank comprises a first output capacitor, a second output capacitor, a third output capacitor and a fourth output capacitor, which are connected in series between a negative electrode and a positive electrode of the output series capacitor bank; capacitances of the first output capacitor, the second output capacitor, the third output capacitor and the fourth output capacitor are same; and the first node is a negative electrode of the first output capacitor or a negative electrode of the second output capacitor; and the second node is a negative electrode of the fourth output capacitor.

5. A multiple-output parallel system, comprising: a plurality of three-level Boost circuits, wherein inputs of the plurality of three-level Boost circuits are independent and outputs of the plurality of three-level Boost circuits are connected in parallel;

and wherein each of the plurality of three-level Boost circuits comprises: an input capacitor, an inductor, a first switch, a second switch, a first freewheeling diode, a second freewheeling diode, a flying capacitor, a balance capacitor, a charging diode, a clamp diode, a discharging diode and an output series capacitor bank, wherein the output series capacitor bank comprises a plurality of output capacitors connected in series, and has a first node and a second node; a potential of the first node is higher than a potential of a cathode of the charging diode, and a potential difference between a cathode of the second freewheeling diode and the second node does not exceed a withstand voltage of the second freewheeling diode;

the input capacitor is connected in parallel with an input power supply; a negative electrode of the input capacitor is connected to a low potential end of the output series capacitor bank; a positive electrode of the input capacitor is coupled to a high potential end of the output series capacitor bank through a first terminal of the inductor, a second terminal of the inductor, an anode of the first freewheeling diode, a cathode of the first freewheeling diode, an anode of the second freewheeling diode and a cathode of the second freewheeling diode sequentially;

a second terminal of the inductor is coupled to the negative electrode of the input capacitor through a first terminal of the first switch, a second terminal of the first switch, a first terminal of the second switch and a second terminal of the second switch sequentially;

the cathode of the first freewheeling diode is coupled to the negative electrode of the input capacitor through a terminal of the flying capacitor, another terminal of the flying capacitor, an anode of the charging diode, a cathode of the charging diode, a terminal of the balance capacitor and another terminal of the balance capacitor sequentially;

the second terminal of the first switch is connected to the anode of the charging diode;

a cathode of the clamp diode is connected to the anode of the second freewheeling diode and an anode of the clamp diode is connected to the second node;

a cathode of the discharging diode is connected to the first node and an anode of the discharging diode is connected to the cathode of the charging diode;

a capacitance difference between the flying capacitor and the balance capacitor does not exceed a predetermined value; and the first switch and the second switch are alternately switched on.

6. The multiple-output parallel system according to claim 5, wherein each of the plurality of three-level Boost circuits has an independent output series capacitor bank, or at least two three-level Boost circuits share an output series capacitor bank;

in the multiple-output parallel system, an overvoltage protection device is provided for each of the output series capacitor banks; and in a three-level Boost circuit where the output series capacitor bank is located, a terminal of the overvoltage protection device is connected to a connection point of the output series capacitor bank and the second freewheeling diode, and another terminal of the overvoltage protection device is connected to the second node; the overvoltage protection device comprises a resistor and a third switch connected in series; the third switch acts according to a predetermined switch control strategy, wherein an absolute value of a potential difference between the connection point and the second node does not exceed the withstand voltage of the second freewheeling diode.

7. The multiple-output parallel system according to claim 6, wherein the switch control strategy is that: in a case that the absolute value of the potential difference is greater than P1, the third switch is switched on; and in a case that the absolute value of the potential difference is less than P2, the third switch is switched off; where P1 and the P2 are predetermined voltages and P1>P2.

8. The multiple-output parallel system according to claim 5, wherein after an output voltage Vout is established and in a case that a nonoperational three-level Boost circuit satisfies Vin≥2*V4, a control strategy of the nonoperational three-level Boost circuit is that: the first switch and the second switch are controlled to be alternately switched on, where Vin represents a voltage of the input power supply, V1 represents the absolute value of the potential difference between the second node and the connection point of the output series capacitor bank and the input capacitor, V4=Vout−V1.

9. The multiple-output parallel system according to claim 5, wherein after an output voltage Vout is established, in a case that an input voltage of a nonoperational three-level Boost circuit Vin is less than a predetermined minimum input voltage Vinmin, the nonoperational three-level Boost circuit does not start to operate; and in a case that the nonoperational three-level Boost circuit satisfies Vinmin≤Vin<2V4, a control strategy of the nonoperational three-level Boost circuit is that: the second switch maintains being switched off, and the first switch is switched on and switched off until Vc1≥V4; then the first switch and the second switch are controlled to be alternately switched on, where Vc1 represents a voltage of the flying capacitor, V1 represents the absolute value of the potential difference between the second node, and the connection point of the output series capacitor bank and the input capacitor, V4=Vout−V1.

10. The multiple-output parallel system according to claim 5, wherein after an output voltage Vout is established and in a case that an input voltage of the nonoperational three-level Boost circuit changes from a short circuit voltage to Vin and V4<Vin<a predetermined minimum input voltage Vinmin, a control strategy of the nonoperational three-level Boost circuit is that: the first switch and the second switch are controlled to be alternately switched on, where V1 represents the absolute value of the potential difference between the second node, and the connection point of the output series capacitor bank and the input capacitor, V4=Vout−V1.

11. The multiple-output parallel system according to claim 5, wherein the output series capacitor bank comprises a first output capacitor, a second output capacitor, a third output capacitor and a fourth output capacitor, which are connected in series between a positive electrode and a negative electrode of the output series capacitor bank; capacitances of the first output capacitor, the second output capacitor, the third output capacitor and the fourth output capacitor are same; and the first node is a positive electrode of the first output capacitor or a positive electrode of the second output capacitor, and the second node is a positive electrode of the fourth output capacitor.

12. A multiple-output parallel system, comprising: a plurality of three-level Boost circuits according to claim 3, wherein inputs of the plurality of three-level Boost circuits are independent and outputs of the plurality of three-level Boost circuits are connected in parallel.

13. The multiple-output parallel system according to claim 12, wherein the output series capacitor bank comprises a first output capacitor, a second output capacitor, a third output capacitor and a fourth output capacitor, which are connected in series between a negative electrode and a positive electrode of the output series capacitor bank; capacitances of the first output capacitor, the second output capacitor, the third output capacitor and the fourth output capacitor are same; and the first node is a negative electrode of the first output capacitor or a negative electrode of the second output capacitor; and the second node is a negative electrode of the fourth output capacitor.

14. The multiple-output parallel system according to claim 8, wherein each of the plurality of three-level Boost circuits has an independent output series capacitor bank, or at least two three-level Boost circuits share an output series capacitor bank;

in the multiple-output parallel system, an overvoltage protection device is provided for each of the output series capacitor banks; and in a three-level Boost circuit where the output series capacitor bank is located, a terminal of the overvoltage protection device is connected to a connection point of the output series capacitor bank and the second freewheeling diode, and another terminal of the overvoltage protection device is connected to the second node; the overvoltage protection device comprises a resistor and a third switch connected in series; the third switch acts according to a predetermined switch control strategy, wherein an absolute value of a potential difference between the connection point and the second node does not exceed the withstand voltage of the second freewheeling diode.

15. The multiple-output parallel system according to claim 14, wherein the switch control strategy is that: in a case that the absolute value of the potential difference is greater than P1, the third switch is switched on; and in a case that the absolute value of the potential difference is less than P2, the third switch is switched off; where P1 and the P2 are predetermined voltages and P1>P2.

16. The multiple-output parallel system according to claim 9, wherein each of the plurality of three-level Boost circuits has an independent output series capacitor bank, or at least two three-level Boost circuits share an output series capacitor bank;

in the multiple-output parallel system, an overvoltage protection device is provided for each of the output series capacitor banks; and in a three-level Boost circuit where the output series capacitor bank is located, a terminal of the overvoltage protection device is connected to a connection point of the output series capacitor bank and the second freewheeling diode, and another terminal of the overvoltage protection device is connected to the second node; the overvoltage protection device comprises a resistor and a third switch connected in series; the third switch acts according to a predetermined switch control strategy, wherein an absolute value of a potential difference between the connection point and the second node does not exceed the withstand voltage of the second freewheeling diode.

17. The multiple-output parallel system according to claim 16, wherein the switch control strategy is that: in a case that the absolute value of the potential difference is greater than P1, the third switch is switched on; and in a case that the absolute value of the potential difference is less than P2, the third switch is switched off; where P1 and the P2 are predetermined voltages and P1>P2.

18. The multiple-output parallel system according to claim 10, wherein each of the plurality of three-level Boost circuits has an independent output series capacitor bank, or at least two three-level Boost circuits share an output series capacitor bank;

in the multiple-output parallel system, an overvoltage protection device is provided for each of the output series capacitor banks; and in a three-level Boost circuit where the output series capacitor bank is located, a terminal of the overvoltage protection device is connected to a connection point of the output series capacitor bank and the second freewheeling diode, and another terminal of the overvoltage protection device is connected to the second node; the overvoltage protection device comprises a resistor and a third switch connected in series; the third switch acts according to a predetermined switch control strategy, wherein an absolute value of a potential difference between the connection point and the second node does not exceed the withstand voltage of the second freewheeling diode.

19. The multiple-output parallel system according to claim 18, wherein the switch control strategy is that: in a case that the absolute value of the potential difference is greater than P1, the third switch is switched on; and in a case that the absolute value of the potential difference is less than P2, the third switch is switched off; where P1 and the P2 are predetermined voltages and P1>P2.

* * * * *